(12) United States Patent
Kanai et al.

(10) Patent No.: US 11,973,184 B2
(45) Date of Patent: Apr. 30, 2024

(54) GARNET-TYPE COMPOSITE METAL OXIDE AND METHOD FOR PRODUCING SAME

(71) Applicants: KANEKA CORPORATION, Osaka (JP); OSAKA UNIVERSITY, Osaka (JP)

(72) Inventors: Kazuaki Kanai, Osaka (JP); Shohei Kitano, Osaka (JP); Makio Naito, Osaka (JP)

(73) Assignees: KANEKA CORPORATION, Osaka (JP); OSAKA UNIVERSITY, Osaka (JP)

( * ) Notice: Subject to any disclaimer, the term of this patent is extended or adjusted under 35 U.S.C. 154(b) by 605 days.

(21) Appl. No.: 17/163,804

(22) Filed: Feb. 1, 2021

(65) Prior Publication Data

US 2021/0151793 A1    May 20, 2021

Related U.S. Application Data

(63) Continuation-in-part of application No. PCT/JP2019/029382, filed on Jul. 26, 2019.

(30) Foreign Application Priority Data

| Aug. 3, 2018 | (JP) | 2018-147004 |
| Aug. 30, 2018 | (JP) | 2018-161931 |
| Feb. 5, 2020 | (JP) | 2020-018115 |

(51) Int. Cl.
*H01M 10/0562* (2010.01)
*H01M 4/38* (2006.01)
(Continued)

(52) U.S. Cl.
CPC ..... *H01M 10/0562* (2013.01); *C01P 2002/52* (2013.01); *C01P 2002/72* (2013.01);
(Continued)

(58) Field of Classification Search
CPC ..... H01M 10/0562; H01M 2300/0071; H01M 2300/0068; H01M 2300/0077; H01M 4/382; H01M 6/18
See application file for complete search history.

(56) References Cited

U.S. PATENT DOCUMENTS

| 2007/0217977 A1* | 9/2007 | Kato | B01F 27/091 |
| | | | 423/111 |
| 2015/0118571 A1 | 4/2015 | Liu et al. | |

(Continued)

FOREIGN PATENT DOCUMENTS

| CN | 107732295 A | 2/2018 |
| JP | 2014-22319 A | 2/2014 |

(Continued)

OTHER PUBLICATIONS

Extended European Search Report issued in corresponding European Patent Application No. EP 19855682.1 dated May 2, 2022 (8 pages).

(Continued)

*Primary Examiner* — Imran Akram
(74) *Attorney, Agent, or Firm* — Osha Bergman Watanabe & Burton LLP

(57) ABSTRACT

One or more embodiments of the present invention are to provide a method for producing a composite metal oxide having an excellent crystallinity by a mechanochemical method. One or more embodiments of the present invention relate to a method for producing a garnet-type composite metal oxide containing Li, La, Zr and O. The method includes a step of treating a mixture containing raw material powders and a flux by a mechanochemical method to react the raw material powders, and the raw material powders contain a Li source powder, a La source powder and a Zr source powder. The raw material powders may further (Continued)

contain at least one selected from an Al source powder and a Ga source powder.

12 Claims, 5 Drawing Sheets

(51) Int. Cl.
   *H01M 6/18* (2006.01)
   *H01M 10/052* (2010.01)

(52) U.S. Cl.
   CPC ...... *C01P 2002/76* (2013.01); *C01P 2004/03* (2013.01); *C01P 2004/61* (2013.01); *C01P 2006/12* (2013.01); *C01P 2006/40* (2013.01); *H01M 4/382* (2013.01); *H01M 6/18* (2013.01); *H01M 2300/0068* (2013.01); *H01M 2300/0071* (2013.01); *H01M 2300/0077* (2013.01)

(56) References Cited

U.S. PATENT DOCUMENTS

| | | | |
|---|---|---|---|
| 2016/0049688 A1* | 2/2016 | Sung | H01M 10/0525 264/674 |
| 2016/0268629 A1* | 9/2016 | Tanaka | H01M 10/0562 |
| 2016/0308244 A1 | 10/2016 | Badding et al. | |
| 2016/0380304 A1* | 12/2016 | Kim | C04B 35/6261 429/189 |
| 2017/0019463 A1 | 1/2017 | Tsunoda | |
| 2017/0047589 A1* | 2/2017 | Noi | H01M 4/62 |
| 2018/0219253 A1 | 8/2018 | Ohta | |
| 2018/0309163 A1 | 10/2018 | Kim et al. | |
| 2019/0367682 A1* | 12/2019 | Suzuki | C08G 75/0254 |
| 2021/0194045 A1* | 6/2021 | Beck | C01F 7/308 |

FOREIGN PATENT DOCUMENTS

| | | |
|---|---|---|
| JP | 2017-91788 A | 5/2017 |
| JP | 2018-65704 A | 4/2018 |
| JP | 2018-516219 A | 6/2018 |
| WO | 2017/002467 A1 | 1/2017 |

OTHER PUBLICATIONS

Shimeng Hao, et al., "Solid-state lithium battery chemistries achieving high cycle performance at room temperature by a new garnet-based composite electrolyte"; Journal of Power Sources, vol. 393, pp. 128-134; Available Online May 12, 2018 (7 pages).

International Search Report issued in corresponding International Application No. PCT/JP2019/029382 dated Oct. 21, 2019 (5 pages).

Written Opinion of the International Searching Authority issued in corresponding International Application No. PCT/JP2019/029382 dated Oct. 21, 2019 (5 pages).

International Search Report issued in corresponding International Application No. PCT/JP2019/029383 dated Oct. 21, 2019 (3 pages).

Written Opinion of the International Searching Authority issued in corresponding International Application No. PCT/JP2019/029383 dated Oct. 21, 2019 (3 pages).

\* cited by examiner

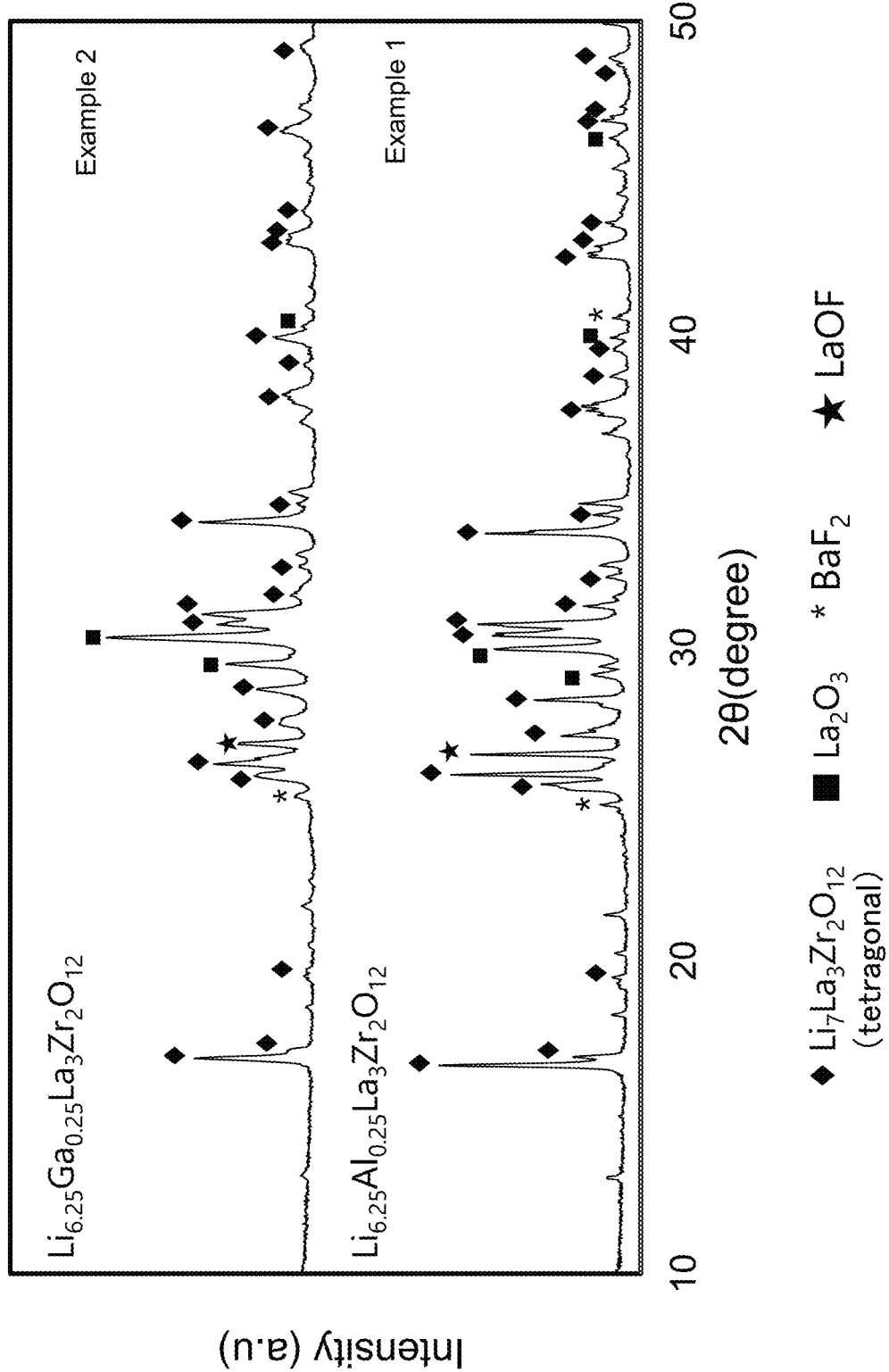
[FIG. 2]

[FIG. 3]
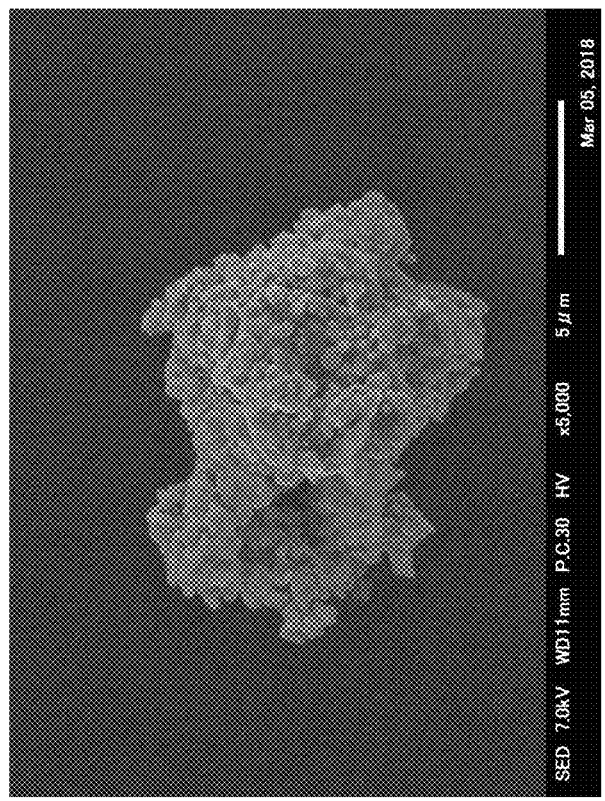

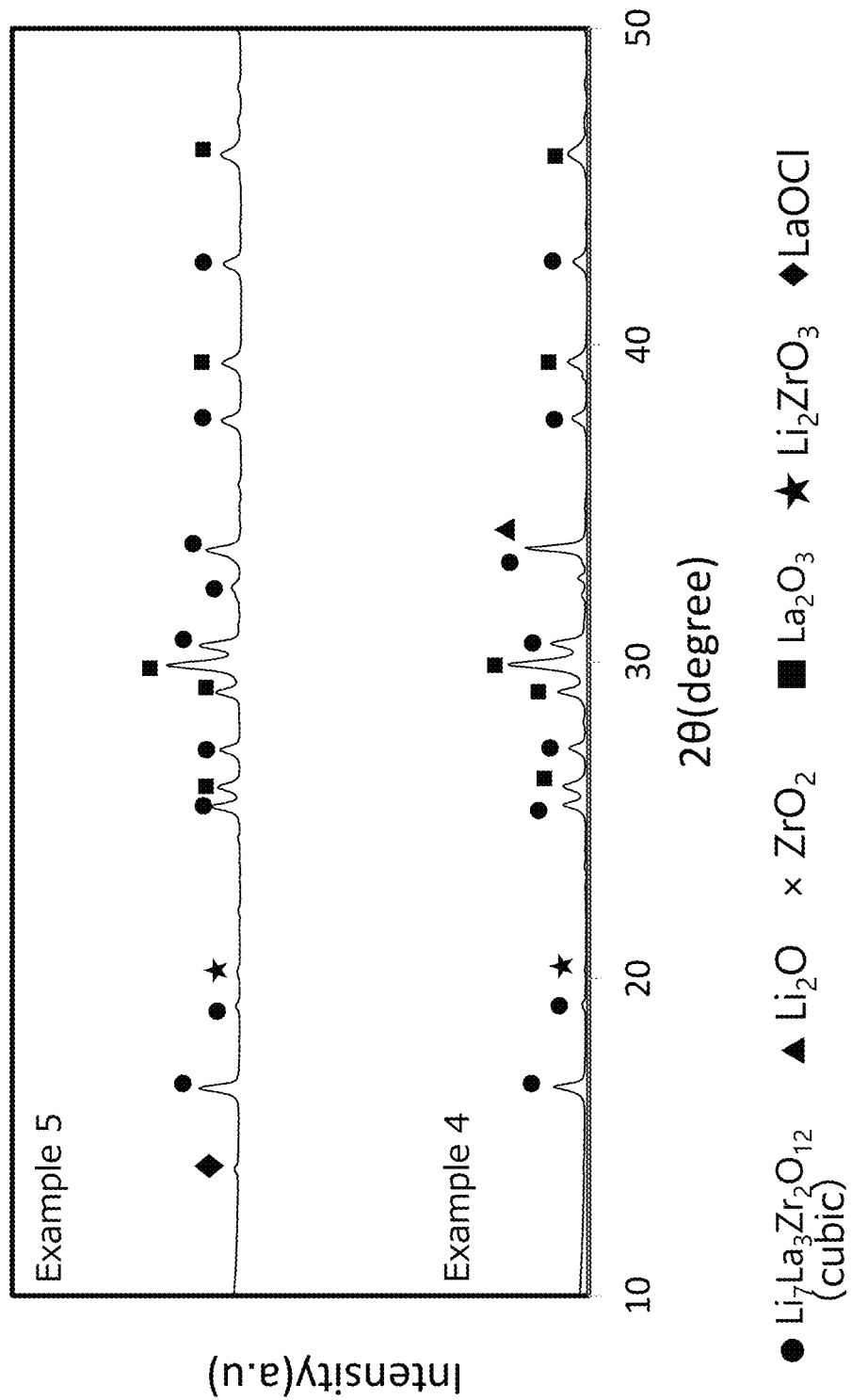

Example 4 cross-sectional STEM image

Example 5 cross-sectional STEM image

GARNET-TYPE COMPOSITE METAL OXIDE AND METHOD FOR PRODUCING SAME

TECHNICAL FIELD

One or more embodiments of the present invention relate to a garnet-type composite metal oxide and a production method therefor.

BACKGROUND

A composite metal oxide comprises a plurality of metal. Some composite metal oxides have a property such as a fluorescence property, a strong dielectric property, a superconducting property and an ion-conducting property, and are applied to various fields depending on a property thereof. As a method for producing a composite metal oxide, a method in which raw materials for each metal element, such as a metal oxide and a metal carbonate, are prepared and the raw materials for each metal element are mixed and burned is well known. On the one hand, Patent document 1 discloses YAG fluorescent material ($Y_3Al_5O_{12}$:Ce) as a composite metal oxide and that YAG fluorescent material ($Y_3Al_5O_{12}$:Ce) can be produced by treating metal oxide powders as raw materials with a flux by a mechanochemical method.

PATENT DOCUMENT

Patent Document 1: WO 2017/002467

SUMMARY

The above-described Patent document 1 discloses that raw material powders can be reacted to each other without firing later by treating a mixture comprising the raw material powders and a flux by a mechanochemical method. As a result of the present inventors' experiment, however, though YAG crystal can be actually produced in the YAG fluorescent material disclosed in Patent document 1 by a mechanochemical method, there is a room for improvement in the crystallinity of YAG crystal produced by a mechanochemical treatment only.

Accordingly, one or more embodiments of the present invention are to provide a method for producing a composite metal oxide having an excellent crystallinity by a mechanochemical method.

The inventors of one or more embodiments of the present invention studied composite metal oxides having various compositions and focused attention on a composite metal oxide which has a garnet structure same as YAG crystal and which comprises Li, La, Zr and O. As a result, the inventors completed one or more embodiments of the present invention by finding that when the above-described composite metal oxide is produced by treating raw material powders and a flux by a mechanochemical method, a garnet-type composite metal oxide having a superior crystallinity to YAG crystal produced by mechanochemical method can be produced.

Hereinafter, one or more embodiments of the present invention are described.

[1] A method for producing a garnet-type composite metal oxide comprising Li, La, Zr and O, comprising
  a step of treating a mixture comprising raw material powders and a flux by a mechanochemical method to react the raw material powders,
  the raw material powders comprising a Li source powder, a La source powder and a Zr source powder.

[2] The production method according to the above [1], wherein the raw material powders further comprise at least one selected from an Al source powder and a Ga source powder.

[3] The production method according to the above [1] or [2], wherein a crystallite diameter of the garnet-type composite metal oxide is 30 nm or more.

[4] The production method according to the above [2] or [3], wherein a crystal system of the garnet-type composite metal oxide is a cubical crystal.

[5] The production method according to any one of the above [1] to [4], wherein
  a bottomed cylindrical vessel equipped with a rotor having an end blade is used,
  a curvature of the end blade is smaller than a curvature of an inner circumference of the bottomed cylindrical vessel,
  there is a predetermined clearance between the end blade and the inner circumference of the bottomed cylindrical vessel, and
  the mixture comprising the raw material powders and the flux is sheared while being compressed in the clearance by rotating the rotor.

[6] The production method according to the above [5], wherein a power of the rotor to a total amount of the raw material powders is 0.05 kW/g or more, and the rotor is rotated for 10 minutes or more.

[7] The production method according to any one of the above [1] to [6], wherein heat is not applied from an external heat source.

[8] A garnet-type composite metal oxide,
  comprising Li, La, Zr and O,
  having a crystallite diameter of 30 nm or more,
  having a particle aggregate structure,
  the particle aggregate structure including primary particles, and
  the primary particles of 90% or more in a particle distribution curve based on number having a long diameter of 3 μm or less.

[9] A garnet-type composite metal oxide,
  comprising Li, La, Zr and O, and
  having a diameter determined from a BET specific surface area of 1.5 μm or less.

[10] The garnet-type composite metal oxide according to the above [8] or [9],
  further comprising at least one selected from Al and Ga,
  wherein a crystal system of the garnet-type composite metal oxide is a cubical crystal.

[11] A solid electrolyte material for a secondary battery, comprising the garnet-type composite metal oxide according to the above [10].

In one or more embodiments of the present invention, a garnet-type composite metal oxide comprising Li, La, Zr and O is produced by a mechanochemical method. According to one or more embodiments of the present invention, a composite metal oxide having an excellent crystallinity can be provided.

BRIEF DESCRIPTION OF THE DRAWINGS

FIG. 2 shows XRD diffraction charts in Examples 1 and 2.

FIG. 3 is a photograph of a SEM image of LLZ produced in Example 1.

FIG. 4 shows XRD diffraction charts in Examples 4 and 5.

DETAILED DESCRIPTION OF THE EMBODIMENTS

Figure 1B:
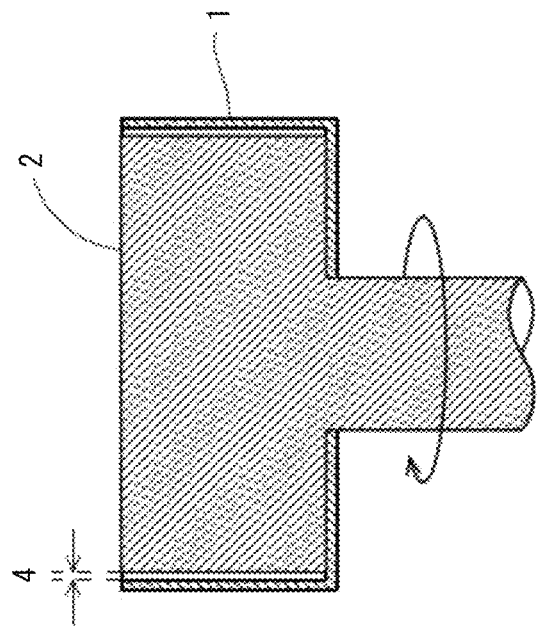
FIG. 1(B) is an A-A' cross-sectional view of FIG. 1(A).

One or more embodiments of the present invention relate to a method for producing a garnet-type composite metal oxide comprising Li, La, Zr and O by a mechanochemical method. A garnet structure generally has a composition formula of $A_3B_2C_3O_{12}$, and the garnet-type composite metal oxide of one or more embodiments of the present invention comprises Li, La, Zr and O and has a composition formula of $Li_7La_3Zr_2O_{12}$ as the A position is occupied by $La^{3+}$, the B position is occupied by $Zr^{4+}$ and the C position and interstitial position are occupied by $Li^+$ in the above composition formula. A part of $Li^+$ site in $Li_7La_3Zr_2O_{12}$ may be substituted with $Al^{3+}$ and/or $Ga^{3+}$ as a preferred embodiment. In this description, the garnet-type composite metal oxide comprising Li, La, Zr and O is hereinafter referred to as "LLZ", and "LLZ" includes the embodiment in which a part of $Li^+$ site is substituted with $Al^{3+}$ and/or $Ga^{3+}$. In addition, a part of $La^{3+}$ site in the LLZ of one or more embodiments of the present invention may be substituted with a dopant such as Ce and Eu.

The LLZ is produced in one or more embodiments of the present invention by using a Li source powder, a La source powder and a Zr source powder as raw material powders and treating a mixture comprising the raw material powders and a flux by a mechanochemical method to react the raw material powders. The mechanochemical method can be more specifically carried out by shearing a mixture comprising the raw material powders while compressing them in a dry condition. In the mechanochemical method, strain energy is accumulated in the raw material powders and naturally released to become heat energy or to be used for surface modification, crystal structure transformation or solid-phase reaction. The raw material powders are mechanochemically treated in the presence of a flux. As a result, a liquid phase is generated on the surface of the raw material powders due to the generated energy, and accelerates the reaction between the raw material powders in one or more embodiments of the present invention. Thus, according to one or more embodiments of the present invention, the target inorganic compound can be obtained in a very short time by a mechanochemical treatment only without high temperature heat treatment. In addition, according to one or more embodiments of the present invention for producing LLZ, it is possible to obtain a compound with a higher crystallinity than the YAG crystal disclosed in the above-described Patent document 1, when the crystals of one or more embodiments of the present invention and Patent document 1 are compared after a mechanochemical treatment (and without a firing).

A Li source powder, a La source powder and a Zr source powder are used as raw material powders, and it is preferred to further use at least one of an Al source powder and a Ga source powder. When at least one of an Al source powder and a Ga source powder is used, LLZ with a cubical crystal can be stabilized and a crystal system of LLZ can become cubical crystal.

As the Li source powder, the La source powder, the Zr source powder, the Al source powder and the Ga source powder, for example, an oxide, a carbonate salt, a hydroxide, a chloride, an alkoxide or the like of each metal, i.e. Li, La, Zr, Al or Ga, can be used. The Li source powder may be a Li oxide or a Li carbonate salt, the La source powder may be a La oxide or a La hydroxide, the Zr source powder may be a Zr oxide or a Zr hydroxide, the Al source powder may be an Al oxide or an Al hydroxide, and the Ga source powder may be a Ga oxide or a Ga hydroxide. All of the Li source powder, La source powder and Zr source powder may be oxide powders of each metal, i.e. a Li oxide powder, a La oxide powder and a Zr oxide powder. When at least one of an Al source powder and a Ga source powder is used, the Al source powder and Ga source powder may be oxide powders, i.e. an Al oxide powder and a Ga oxide powder.

The ratios of the Li source powder, the La source powder, the Zr source powder, the Al source powder and the Ga source powder to be used may be adjusted to stoichiometric ratios of the target composition. In particular, when the Al source powder and/or the Ga source powder is used, a molar ratio of a total amount of Al amount and Ga amount to a Li amount in the raw material powders may be adjusted to 0.05 or more. As a result, the crystal system of the thus obtained LLZ can be cubical crystal. The above molar ratio may be 0.06 or more, or 0.08 or more. The upper limit is not restricted, and for example, the molar ratio is 0.2 or less.

It is preferred that a powder property of each raw material powder is appropriately adjusted. For example, a specific surface area: $S_w$ (m²/g) measured by BET method may be 0.5 m²/g or more and 25 m²/g or less. A specific surface area diameter: $d_{BET}$ (nm) can be calculated from a specific surface area: $S_w$ by the following formula.

$$d_{BET}=6/(\rho \cdot S_w)$$

In the above formula, p is a theoretical density.

Specific surface area diameters: $d_{BET}$ (nm) may be 300 nm or more and 2000 nm or less, or 500 nm or more and 2000 nm or less in the case of the Li source powder, 50 nm or more and 700 nm or less, or 400 nm or more and 700 nm or less in the case of the La source powder, 20 nm or more and 100 nm or less in the case of the Zr source powder, 80 nm or more and 200 nm or less in the case of the Al source powder, and 20 nm or more and 100 nm or less in the case of the Ga source powder.

One kind of flux may be used, or two or more kinds of flux may be used. An example of a flux includes a metal hydroxide, a metal oxide and a metal halide. The fluxes have an effect to increase a contact area by generating a liquid phase between the raw material powders. When such a flux is used, the raw material powders can be reacted to each other by a mechanochemical method. An example of the metal hydroxide includes $Al(OH)_3$, $Ga(OH)_3$, KOH, $Sr(OH)_2$, NaOH, $Ba(OH)_2$, $Mg(OH)_2$, LiOH and $La(OH)_3$, and at least one of the examples can be used. The preferred metal hydroxide is $Al(OH)_3$. An example of the metal oxide includes PbO and $B_2O_3$. The metal halide may be a metal fluoride and a metal chloride, and an example of the metal include an alkali metal, an alkaline earth metal, Sc, Y, Al, Pb, Bi or Zn. The metal fluoride may be at least one selected from the group consisting of LiF, $ScF_3$, $BaF_2$, $YF_3$, $AlF_3$ and $SrF_3$, and at least one selected from the group consisting of LiF or $BaF_2$. When the metal fluoride includes LiF, a ratio of LiF in 100 mol % of the total metal fluoride may be 40 mol % or more, 50 mol % or more, or 60 mol % or more. The upper limit of the amount of LiF is, for example, 95 mol % or less, or may be 90 mol % or less. If the amount of LiF is a prescribed amount or more, an ion conductivity of a solid electrolyte obtained from the garnet-type composite metal oxide of the present invention tends to be excellent. When the metal fluoride contains LiF and at least one kind of other metal fluoride, a solid electrolyte obtained from the garnet-type composite metal oxide of the present invention can show the excellent ion conductivity. The metal chloride may be an alkali metal chloride or LiCl. The metal halide may be a metal fluoride. A melting point of the flux may be, for example, 200° C. or higher and 1400° C. or lower or 400° C. or higher and 1300° C. or lower. A specific surface area diameter: $d_{BET}$ determined from BET specific surface area may be, for example, 50 nm or more, 80 nm or more, or 100 nm or more. With respect to the upper limit, the specific surface area diameter: $d_{BET}$ may be 2000 nm or less, 1600 nm or less, 200 nm or less, or 150 nm or less. If two kinds or more of flux are used, a melting temperature of a flux having the lowest melting temperature may be within the range of the melting temperature above-described. An amount of the flux may be appropriately determined in consideration of the balance between the kind of the raw material powders to be used and the mechanochemical treatment condition, and for example, the amount to the total amount of the raw material powders is 4 mass % or more and 15 mass % or less.

Figure 1A:
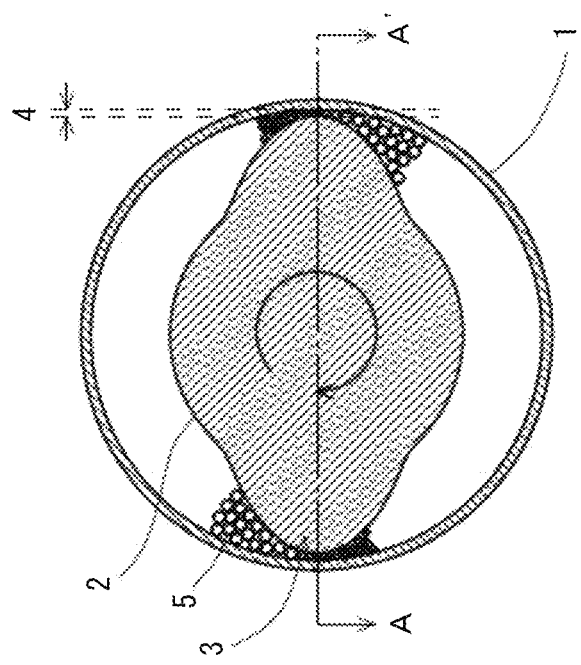
FIG. 1(A) is a cross-sectional view of a grinding mill usable in a mechanochemical method in the direction perpendicular to the axis of rotation thereof.

More specifically, the mechanochemical method can be carried out by shearing the mixture comprising the raw material powders while compressing them in a dry condition as described above. One embodiment of the mechanochemical method is explained using a figure. FIG. 1(A) and FIG. 1(B) are schematic diagrams of a grinding mill capable of giving compressing force and shearing force to the mixture comprising raw material powders. FIG. 1(A) is a cross-sectional view perpendicular to an axis of rotation, and FIG. 1(B) is a cross-sectional view of A-A' of FIG. 1(A). The grinding mill of FIG. 1(A) and FIG. 1(B) is equipped with a bottomed cylindrical vessel 1 and a rotor 2. The rotor 2 has an end blade 3 having a smaller curvature than a curvature of the inner circumference of the bottomed cylindrical vessel 1, and there is a clearance 4 between the end blade 3 and the inner circumference of the bottomed cylindrical vessel 1. When the rotor 2 is rotated, compressing force and shearing force are given to a mixture 5 of the raw material powders and the flux.

With respect to the condition of the mechanochemical treatment, an excessively weak reaction condition is not preferred as the raw material powders are not reacted to each other, and an excessively strong reaction condition is not preferred as a once generated crystal becomes amorphous. When the condition of the mechanochemical treatment is not suitable, the condition may be appropriately changed depending on the reason such as insufficient reaction and amorphization or depending on the kind and amount of the raw materials and the flux. For example, the condition is adjusted as follows.

The range of the above clearance varies depending on the amount of the raw material powders, the difference between the curvature of the end blade of the rotor and the curvature of the inner circumference of the vessel, or the treatment power of the rotor. For example, the clearance may be less than 1 mm. When the clearance is included in the range, compressing force and shearing force can be sufficiently given to the mixture of raw material powders to accelerate the reaction between raw material powders. The clearance may be 0.9 mm or less or 0.8 mm or less. With respect to the lower limit of the clearance, the clearance may be, for example, 100 μm or more or 0.5 mm or more.

A rotating power of the rotor to the total mass of the raw material powders is, for example, 0.05 kW/g or more. When the rotating power is adjusted to be higher, the solid-phase reaction between the raw material powders is accelerated. The rotating power may be 0.06 kW/g or more, 0.08 kW/g or more, 0.1 kW/g or more, or 0.15 kW/g or more. The upper limit of the rotating power is not particularly restricted and is, for example, 0.5 kW/g. A rotation frequency per minute of the rotor varies depending on a size of the apparatus and a configuration of the rotor, and may be, for example, 2000 rpm or more and 6000 rpm or less or 3000 rpm or more and 5000 rpm or less in the above-described rotating power range.

A rotating time of the rotor can be appropriately adjusted depending on the rotating power of the rotor and may be, for example, 5 minutes or more, 10 minutes or more, or 20 minutes or more. When the rotor may be rotated for 5 minutes or more or 10 minutes or more, compressing force and shearing force can be sufficiently given to the raw material powders so that the solid-phase reaction between raw material powders is accelerated to obtain the LLZ. The upper limit of the rotating time of the rotor is not particularly restricted and the rotating time may be adjusted to 30 minutes or less, since when the rotating time is excessively long, the crystallinity of the target compound is decreased and excessive energy is consumed.

The mechanochemical treatment produces heat, since strain energy is accumulated in the raw material powders due to the shear and released to be thermal energy. Thus, the production method of one or more embodiments of the present invention can be conducted without heating from an external heat source. The mechanochemical treatment may be conducted in a condition with heat or with cooling, for example, by water. An achieving temperature of the cylindrical vessel during the mechanochemical treatment may be adjusted to, for example, 50° C. or higher, or 130° C. or higher, and 500° C. or lower.

An atmosphere during the mechanochemical treatment is not particularly restricted and may be any one of oxygen-containing atmosphere such as air, inert gas atmosphere and reducing gas atmosphere. An example of the inert gas includes nitrogen, helium and argon, particularly preferably nitrogen gas. An example of the reducing gas includes a mixed gas of the above inert gas, particularly preferably nitrogen gas, and 3% or more and 5% or less of hydrogen gas.

A material of the above-described bottomed cylindrical vessel is not particularly restricted and exemplified by carbon steel and stainless steel such as SUS304. The bottomed cylindrical vessel may be coated so that an impurity is not unmixed in the generated LLZ. An inner diameter of the vessel is, for example, 50 mm or more and 500 mm or less. The number of the end blade may be 1 or more, 2 or more, and generally 8 or less.

The crystallinity of the LLZ obtained by the mechanochemical treatment using the flux is excellent. The LLZ may be fired after the mechanochemical treatment in order to improve the crystallinity. A firing temperature may be lowered or a firing time can be shorten in comparison with those of the above-described Patent document 1, since the LLZ has excellent crystallinity even without firing after the mechanochemical treatment. For example, the firing temperature is 1300° C. or lower (the lower limit thereof is, for example, 500° C. or higher), and the firing time is 20 hours or less (the lower limit thereof is, for example, 30 minutes or more). When firing is not conducted or a firing condition is mildly adjusted, a misalignment of the composition due to volatilization of Li can be advantageously suppressed.

The flux may be removed by using an acid after the raw material powders are reacted by the mechanochemical treatment in one or more embodiments of the present invention. An inorganic acid such as hydrochloric acid and sulfuric acid can be used as such an acid. In one or more embodiments of the present invention, the LLZ synthesized by the mechanochemical method may be further fired as described above, but when the LLZ is not fired, the flux may be removed by using an acid particularly after the metal oxide powders are reacted by the mechanochemical treatment. When the LLZ is fired after the mechanochemical treatment, the firing is carried out in the presence of the flux and the flux may be removed after the firing. The LLZ may be fired in the presence of the flux, since the solid phase—liquid phase reaction is accelerated during the firing. For example, the treatment using an acid may be conducted for 1 hour or more and 3 hour or less. After the acid treatment, the LLZ is washed using pure water and then may be heated at about 100° C. or higher and about 400° C. or lower, or 200° C. or higher and 300° C. or lower, for 1 hour or more, 2 hours or more, 3 hours or more, even more or 4 hour or more, and generally 10 hours or less, to sufficiently remove water.

The LLZ obtained in an embodiment without firing after the mechanochemical treatment in the above-described production method of one or more embodiments of the present invention, is a garnet-type composite metal oxide which comprises Li, La, Zr and O and which further comprises at least one selected from Al and Ga as needed, and has excellent crystallinity. In addition, when such LLZ is observed using an electron microscope such as SEM (Scanning Electron Microscope) or STEM (Scanning Transmission Electron Microscope), an aggregate structure composed of particles such as fine particles can be observed.

An excellent crystallinity can be represented by the crystallite diameter calculated from a half width of an X-ray diffraction peak by the following Scherrer equation represented as the following formula (1).

$$Dc = K\lambda/\beta\cos\theta \quad (1)$$

Dc: crystallite diameter, $\lambda$: wavelength of X-ray, K: Scherrer constant, $\beta$: half width, $\theta$: Bragg angle A crystallite diameter of the LLZ according to one or more embodiments of the present invention may be 30 nm or more, 35 nm or more, 40 nm or more, and generally 50 nm or less.

When the LLZ of one or more embodiments of the present invention without being fired at high temperature is observed using an electron microscope such as SEM or STEM at, for example, about 1000 magnification or more and about 5000 magnification or less, an aggregate structure which is composed of particles such as fine particles and derived from a particle shape of the raw material powders can be observed. The observed long diameter of 90% or more primary particles based on number in the particle aggregate structure of the LLZ according to one or more embodiments of the present invention may be 3 μm or less, 2 μm or less, 1.5 μm or less, 1.3 μm or less, or 1.2 μm or less. It may be that 100% particles based on number, i.e. all of the particles, are included in the above-described long diameter range of the primary particles, including the preferred range. On the one hand, the LLZ obtained by a conventional firing method is different from the LLZ of one or more embodiments of the present invention in the point that the raw materials are solid-solved and the interface between the raw material powders is vanished due to high temperature; as a result, coarse particles are formed or the particle aggregate structure is not formed and the particle structure composed of fine particles observed in the LLZ of one or more embodiments of the present invention is not observed. The above-described primary particle is the smallest unit among the observed particles. The above-described long diameter of the primary particle means the longest line segment which passes through the center or gravity center of the particle and which is separated by the outer circumference of the particle.

When the surface of the LLZ according to one or more embodiments of the present invention is covered with a melt-solidified material, the particle aggregate structure may be observed using an electron microscope in the cross-section obtained by cutting the LLZ of one or more embodiments of the present invention at an arbitrary section. The long diameter of the particle which constitutes the aggregate structure as the minimum unit may be also measured in the above-described cross-section.

The LLZ of one or more embodiments of the present invention is also referred to as a garnet-type composite metal oxide which comprises Li, La, Zr and O and of which BET specific surface area diameter is 1.5 μm or less. The BET specific surface area diameter of the LLZ according to one or more embodiments of the present invention may be 1.3 μm or less, 1.0 μm or less, or 800 nm or less, and 150 nm or more, for example, with respect to the lower limit thereof. In particular, it is preferred that the BET specific surface area diameter of the LLZ according to one or more embodiments of the present invention which is not covered with a melt-solidified material is included in the above-described range. The BET specific surface area diameter of the LLZ according to one or more embodiments of the present invention can be calculated by the same formula as the above-described formula for the specific surface area diameter of the raw material powders.

The tetragonal garnet-type composite metal oxide comprising Li, La, Zr and O is generally stable at room temperature, and the crystal system of the LLZ according to one or more embodiments of the present invention further comprising at least one selected from Al and Ga can become cubic due to the cubic crystal stabilizing effect by Al and Ga. When the final product obtained by the production method of one or more embodiments of the present invention is analyzed by XRD, a ratio of the maximum peak area of the LLZ to the total of the maximum peak area of the La source powder and the maximum peak area of the LLZ is, for example, 20% or more and 60% or less. When $La_2O_3$ is used as the La source, the maximum peak area of the La source powder is the maximum peak area of $La_2O_3$.

The LLZ of one or more embodiments of the present invention can be used as a material of a solid electrolyte material for a secondary battery, since the LLZ is ionically conductive. In addition, when a part of La site is substituted with Ce, Eu or the like, the LLZ can be also used as a fluorescent material.

The present application claims the benefit of the priority dates of Japanese patent application No. 2018-147004 filed on Aug. 3, 2018, and Japanese patent application No. 2018-161931 filed on Aug. 30, 2018. All of the contents of the Japanese patent application No. 2018-147004 filed on Aug. 3, 2018, and Japanese patent application No. 2018-161931 filed on Aug. 30, 2018, are incorporated by reference herein.

EXAMPLES

Hereinafter, the examples are described to demonstrate one or more embodiments of the present invention more specifically, but one or more embodiments of the present invention are in no way restricted by the examples, and the examples can be appropriately modified to be carried out within a range which adapts to the contents of this specification. Such a modified example is also included in the range of one or more embodiments of the present invention.

Example 1

As raw materials of $Li_{6.25}Al_{0.25}La_3Zr_2O_{12}$, powders of $Li_2O$ (manufactured by Kojundo Chemical Laboratory Co., Ltd., Purity: 99%, Specific surface area $S_w$: 2.1 m$^2$/g, Specific surface area diameter $d_{BET}$: 1421 nm), $La_2O_3$ (manufactured by Kojundo Chemical Laboratory Co., Ltd., Purity: 99.9%, Specific surface area $S_w$: 1.7 m$^2$/g, Specific surface area diameter $d_{BET}$: 543 nm), $ZrO_2$ (manufactured by Kojundo Chemical Laboratory Co., Ltd., Purity: 98%, Specific surface area $S_w$: 18.4 m$^2$/g, Specific surface area diameter $d_{BET}$: 57 nm) and $Al_2O_3$ (manufactured by Kojundo Chemical Laboratory Co., Ltd., Purity: 99.99%, Specific surface area $S_w$: 11.3 m$^2$/g, Specific surface area diameter $d_{BET}$: 134 nm) were respectively weighed at a stoichiometric ratio that forms $Li_{6.25}Al_{0.25}La_3Zr_2O_{12}$ as the obtained composite metal oxide, and in a total amount of 30 g. The raw materials and 10 mass parts of $BaF_2$ (Purity: 99.99%, Specific surface area $S_w$: 9 m$^2$/g, Specific surface area diameter $d_{BET}$: 137 nm, Melting point: 1280° C.) relative to 100 mass parts of the total raw materials were added into a grinding mill shown as FIG. 1(A) and FIG. 1(B). The bottomed cylindrical vessel 1 was composed of SUS304, the inner diameter thereof was 80 mm, and the clearance 4 between the inner circumference of the vessel 1 and the end blade 3 of the rotor 2 was 0.8 mm. The grinding mill was rotated at the frequency per minute of 4500 rpm and the power requirement of 3 kW for 20 minutes to conduct the mechanochemical treatment. The achieving temperature of the vessel was about 260° C.

The crystal structure of the obtained product was analyzed using XRD (X-ray Diffraction analysis) apparatus manufactured by Bruker. The measurement was conducted using CuKα ray under the conditions of λ=1.5418 nm and θ=10 to 50°. As a result, tetragonal LLZ of which a part of Li site was substituted with Al was generated in the obtained product. The crystallite diameter calculated from the half width of the diffraction peak having maximum XRD intensity on the basis of Scherrer equation was 41 nm. The ratio of the maximum peak area of the LLZ to the total of the maximum peak area of $La_2O_3$ and the maximum peak area of the LLZ in the XRD of the obtained product was 54%.

Example 2

As raw materials of $Li_{6.25}Ga_{0.25}La_3Zr_2O_{12}$, powders of $Li_2O$ (manufactured by Kojundo Chemical Laboratory Co., Ltd., Purity: 99%, Specific surface area $S_w$: 2.1 m$^2$/g, Specific surface area diameter $d_{BET}$: 1421 nm), $La_2O_3$ (manufactured by Kojundo Chemical Laboratory Co., Ltd., Purity: 99.9%, Specific surface area $S_w$: 1.7 m$^2$/g, Specific surface area diameter $d_{BET}$: 543 nm), $ZrO_2$ (manufactured by Kojundo Chemical Laboratory Co., Ltd., Purity: 98%, Specific surface area $S_w$: 18.4 m$^2$/g, Specific surface area diameter $d_{BET}$: 57 nm) and $Ga_2O_3$ (manufactured by Kojundo Chemical Laboratory Co., Ltd., Purity: 99.99%, Specific surface area $S_w$: 10.4 m$^2$/g, Specific surface area diameter $d_{BET}$: 90 nm) were respectively weighed at a stoichiometric ratio that forms $Li_{6.25}Ga_{0.25}La_3Zr_2O_{12}$ as the obtained composite metal oxide, and in a total amount of 30 g. The raw materials and 10 mass parts of $BaF_2$ (Purity: 99.99%, Specific surface area $S_w$: 9 m$^2$/g, Specific surface area diameter $d_{BET}$: 137 nm, Melting point: 1280° C.) relative to 100 mass parts of the total raw materials were added into a grinding mill shown as FIG. 1(A) and FIG. 1(B). The conditions of the grinding mill were adjusted similarly to Example 1 to conduct the mechanochemical treatment. The achieving temperature of the vessel was about 260° C.

The crystal structure of the obtained product was measured similarly to Example 1. As a result, tetragonal LLZ of which a part of Li site was substituted with Ga was generated in the obtained product. The crystallite diameter calculated from the half width of the diffraction peak having maximum XRD intensity on the basis of Scherrer equation was 39 nm. The ratio of the maximum peak area of the LLZ to the total of the maximum peak area of $La_2O_3$ and the maximum peak area of the LLZ in the XRD of the obtained product was 43%.

The specific surface area of the obtained product was calculated from the nitrogen gas adsorption quantity using MICROMERITICS ASAP2010, and the specific surface area diameter was determined from the BET specific surface area and the density of the product. As a result, the specific surface area was 1.8 m$^2$/g and the specific surface area diameter was 652 nm.

Example 3

The mechanochemical treatment was conducted similarly to Example 2 except that raw material powders were weighed at a stoichiometric ratio that forms $Li_{5.5}Ga_{0.5}La_3Zr_2O_{12}$ as the obtained composite metal oxide and the power of the grinding mill was adjusted to 2.5 kW. The achieving temperature of the vessel was about 260° C.

The crystal structure of the obtained product was measured similarly to Example 1. As a result, cubical LLZ of which a part of Li site was substituted with Ga was generated in the obtained product. The crystallite diameter calculated from the half width of the diffraction peak having maximum XRD intensity on the basis of Scherrer equation was 31 nm. The ratio of the maximum peak area of the LLZ to the total of the maximum peak area of $La_2O_3$ and the maximum peak area of the LLZ in the XRD of the obtained product was 24%.

The specific surface area of the obtained product was calculated from the nitrogen gas adsorption quantity using MICROMERITICS ASAP2010, and the specific surface area diameter was determined from the BET specific surface area and the density of the product. As a result, the specific surface area was 4.2 m$^2$/g and the specific surface area diameter was 280 nm.

Example 4

As raw materials of $Li_{5.5}Ga_{0.5}La_3Zr_2O_{12}$, powders of $Li_2O$ (manufactured by Kojundo Chemical Laboratory Co., Ltd., Purity: 99%, Specific surface area $S_w$: 2.1 m$^2$/g, Specific surface area diameter $d_{BET}$: 1421 nm), $La_2O_3$ (manufactured by Kojundo Chemical Laboratory Co., Ltd., Purity: 99.9%, Specific surface area $S_w$: 1.7 m$^2$/g, Specific surface area diameter $d_{BET}$: 543 nm), $ZrO_2$ (manufactured by Kojundo Chemical Laboratory Co., Ltd., Purity: 98%, Specific surface area $S_w$: 18.4 m$^2$/g, Specific surface area diameter $d_{BET}$: 57 nm) and $Ga_2O_3$ (manufactured by Kojundo Chemical Laboratory Co., Ltd., Purity: 99.99%, Specific surface area $S_w$: 10.4 m$^2$/g, Specific surface area diameter $d_{BET}$: 90 nm) were respectively weighed at a stoichiometric ratio that forms $Li_{5.5}Ga_{0.5}La_3Zr_2O_{12}$ as the obtained composite metal oxide, and in a total amount of 30 g. The raw materials and 10 mass parts of LiCl (Purity: 99.99%, Specific surface area $S_w$: 1.9 m²/g, Specific surface area diameter $d_{BET}$: 1504 nm, Melting point: 613° C.) relative to 100 mass parts of the total raw materials were added into a grinding mill shown as FIG. 1(A) and FIG. 1(B). The bottomed cylindrical vessel 1 was composed of SUS304, the inner diameter thereof was 80 mm, and the clearance 4 between the inner circumference of the vessel 1 and the end blade 3 of the rotor 2 was 0.8 mm. The grinding mill was rotated at the frequency per minute of 4274 rpm and the power requirement of 3 kW for 6 minutes to conduct the mechanochemical treatment. The achieving temperature of the vessel was about 65° C.

The crystal structure of the obtained product was analyzed using XRD (X-ray Diffraction analysis) apparatus manufactured by Bruker. The measurement was conducted using CuKα ray under the conditions of λ=1.5418 nm and θ=10 to 50°. As a result, cubical LLZ of which a part of Li site was substituted with Ga was generated in the obtained product. The ratio of the maximum peak area of the LLZ to the total of the maximum peak area of the LLZ and the maximum peak area of $La_2O_3$ from the XRD chart was 29%. The crystallite diameter calculated from the half width of the diffraction peak having maximum XRD intensity on the basis of Scherrer equation was 33.6 nm.

Figure 5A:
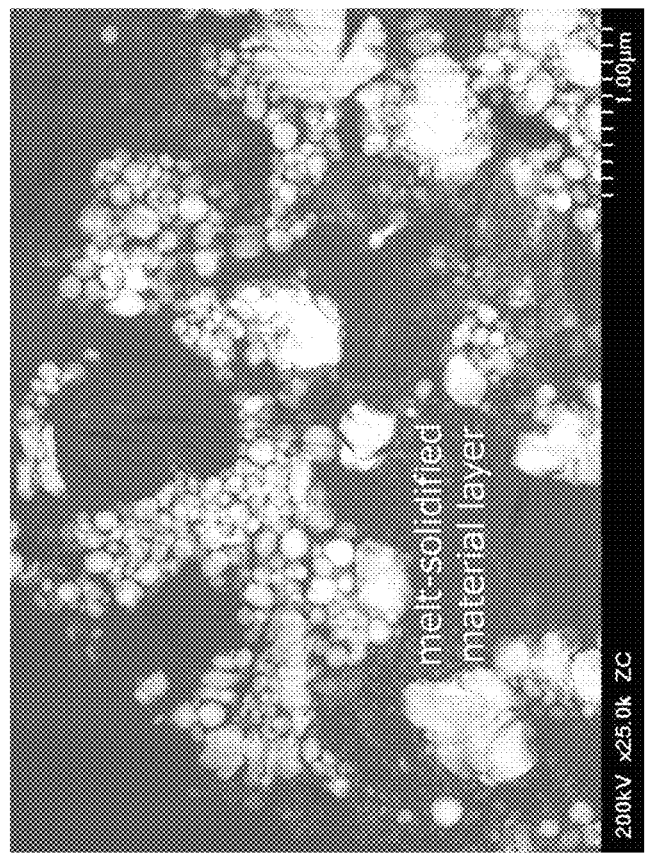
FIGS. 5(A) and 5(B) show photographs of a STEM image of LLZ produced in Examples 4 and 5.
Figure 5B:
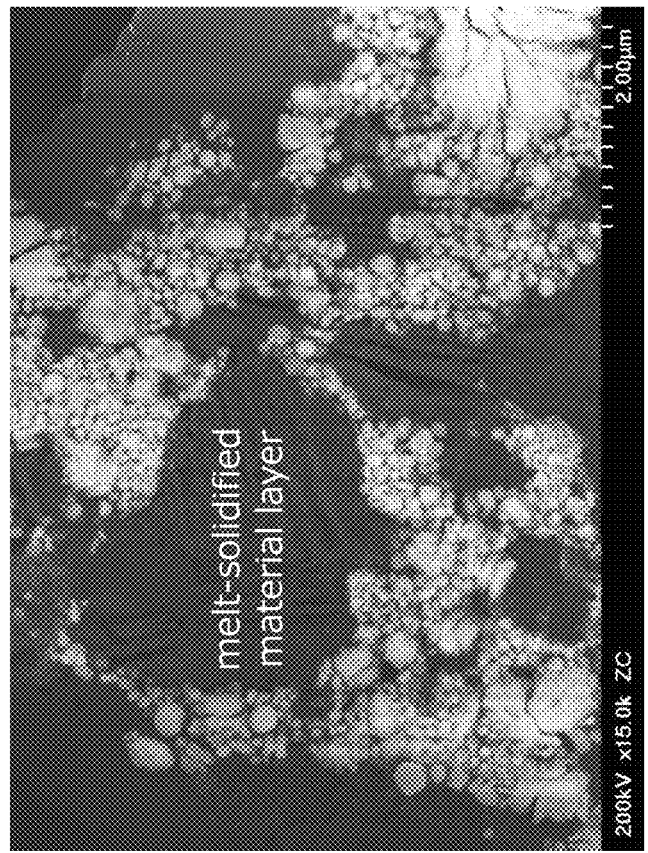

The obtained LLZ was cut, and the cross-section surface was observed using STEM (HD-2700) manufactured by Hitachi High-Tech Corporation with a magnification of 15000 times. As a result, it was confirmed that the LLZ has a particle aggregate structure and the long diameter of the primary particle of the constituent particle was 3 μm or less as shown in FIG. 5(A). The part having darker color, i.e. black or grey, in FIG. 5(A) and FIG. 5(B) is a melt-solidified material.

Example 5

The mechanochemical treatment was conducted similarly to Example 4 except that the rotating time of the grinding mill was 20 minutes and the frequency per minute was 4446 rpm. The achieving temperature of the vessel was about 290° C.

The crystal structure and the ratio of the generated LLZ of the obtained product were determined similarly to the method of Example 4. As a result, cubical LLZ of which a part of Li site was substituted with Ga (FIG. 4) was generated, and the ratio of the maximum peak area of the LLZ to the total of the maximum peak area of the LLZ and the maximum peak area of $La_2O_3$ was 37%. The crystallite diameter calculated from the half width of the diffraction peak having maximum XRD intensity on the basis of Scherrer equation was 32.5 nm.

The obtained LLZ was cut, and the cross-section surface was observed using STEM (HD-2700) manufactured by Hitachi High-Tech Corporation with a magnification of 25000 times. As a result, it was confirmed that the LLZ has a particle aggregate structure and the long diameter of the primary particle of the constituent particle was 3 μm or less as shown in FIG. 5(B).

Comparative Example 1

The mechanochemical treatment was conducted similarly to Example 1 except that $BaF_2$ was not used. The crystal structure of the obtained product was evaluated similarly to the method of Example 1. As a result, only diffraction peaks derived from the raw material powders were detected and LLZ could not obtained.

Comparative Example 2

As raw materials of $Y_{2.97}Al_5O_{12}:Ce^{3+}_{0.03}$, powders of $Y_2O_3$, $CeO_2$ and $Al_2O_3$ all of which were manufactured by Kojundo Chemical Laboratory Co., Ltd., were respectively weighed at a stoichiometric ratio that forms $Y_{2.97}Al_5O_{12}:Ce^{3+}_{0.03}$ as the obtained phosphor and in a total amount of 30 g. The raw materials and 6 mass parts of $BaF_2$ relative to 100 mass parts of the total raw materials were added into a grinding mill. The bottomed cylindrical vessel 1 was composed of SUS304, the inner diameter thereof was 80 mm, and the clearance 4 between the inner circumference of the vessel 1 and the end blade of the rotor 2 was 1.0 mm. The grinding mill was rotated at the frequency per minute of 4500 rpm and the power requirement of 3 kW for 10 minutes to conduct the mechanochemical treatment.

The crystal structure of the obtained product was analyzed using XRD apparatus manufactured by Bruker. The measurement was conducted using CuKα ray under the conditions of λ=1.5418 nm and θ=10 to 50°. As a result, the crystal of the obtained product had YAG phase. The crystallite diameter calculated from the half width of the XRD diffraction peak of the YAG phase was 26 nm.

The results of the above-described Examples and Comparative examples are shown in Table 1.

TABLE 1

| | Target composition | Main raw material | | | Raw material for doping | Flux (Reaction auxiliary) | Treatment condition Treatment power (kW) |
|---|---|---|---|---|---|---|---|
| Example 1 | $Li_{6.25}Al_{0.25}La_3Zr_2O_{12}$ | $Li_2O$ 3.90 g | $La_2O_3$ 20.41 g | $ZrO_2$ 5.15 g | $Al_2O_3$ 0.53 g | $BaF_2$ 10 mass % | 3 |
| Example 2 | $Li_{6.25}Ga_{0.25}La_3Zr_2O_{12}$ | $Li_2O$ 3.84 g | $La_2O_3$ 20.11 g | $ZrO_2$ 5.07 g | $Ga_2O_3$ 0.94 g | $BaF_2$ 10 mass % | 3 |
| Example 3 | $Li_{5.5}Ga_{0.5}La_3Zr_2O_{12}$ | $Li_2O$ 3.32 g | $La_2O_3$ 19.79 g | $ZrO_2$ 4.99 g | $Ga_2O_3$ 1.90 g | $BaF_2$ 10 mass % | 2.5 |
| Example 4 | $Li_{5.5}Ga_{0.5}La_3Zr_2O_{12}$ | $Li_2O$ 3.32 g | $La_2O_3$ 19.79 g | $ZrO_2$ 4.99 g | $Ga_2O_3$ 1.90 g | LiCl 10 mass % | 3 |
| Example 5 | $Li_{5.5}Ga_{0.5}La_3Zr_2O_{12}$ | $Li_2O$ 3.32 g | $La_2O_3$ 19.79 g | $ZrO_2$ 4.99 g | $Ga_2O_3$ 1.90 g | LiCl 10 mass % | 3 |
| Comparative example 1 | $Li_{6.25}Al_{0.25}La_3Zr_2O_{12}$ | $Li_2O$ 3.90 g | $La_2O_3$ 20.41 g | $ZrO_2$ 5.15 g | $Al_2O_3$ 0.53 g | None | 3 |
| Comparative example 2 | $Y_{2.97}Al_5O_{12}:Ce_{0.03}$ | $Y_2O_3$ 16.90 g | $Al_2O_3$ 12.84 g | — | $CeO_2$ 0.26 g | $BaF_2$ 6 mass % | 3 |

TABLE 1-continued

|  | Treatment condition | | Product | | |
|---|---|---|---|---|---|
|  | Treatment time [min] | Clearance [mm] | Half width | Crystallite diameter [nm] | Crystal system |
| Example 1 | 20 | 0.8 | 0.203 | 41 | tetragonal |
| Example 2 | 20 | 0.8 | 0.213 | 39 | tetragonal |
| Example 3 | 20 | 0.8 | 0.27 | 31 | cubic |
| Example 4 | 6 | 0.8 | 0.25 | 33.6 | cubic |
| Example 5 | 20 | 0.8 | 0.26 | 32.5 | cubic |
| Comparative example 1 | 20 | 0.8 | remained as raw material powders | | |
| Comparative example 2 | 10 | 1 | 0.333 | 26 | — |

In addition, the XRD diffraction charts of Examples 1 and 2 are shown as FIG. 2, and XRD diffraction charts of Examples 4 and 5 are shown as FIG. 4.

As shown in Table 1, the LLZ excellent in crystallinity, in other words, having a crystallite diameter of 30 nm or more, could be produced by Examples 1 to 5 in which the LLZ was produced by the mechanochemical treatment using a flux. It can be clear from FIG. 2 and FIG. 4 that the LLZ could be formed in Examples 1, 2, 4 and 5. In addition, the photograph of the SEM image of the LLZ produced in Example 1 is shown as FIG. 3, and the STEM image photographs of the cross-section of the LLZ produced in Examples 4 and 5 are shown as FIG. 5(A) and FIG. 5(B). It is clear from FIG. 3, FIG. 5(A) and FIG. 5(B) that the LLZ of one or more embodiments of the present invention has a particle aggregate structure and the long diameter of the primary particle is 3 μm or less. On the one hand, the raw material powders remained and LLZ was not generated even after the mechanochemical treatment in Comparative example 1 in which a flux was not used. In addition, in Comparative example 2 in which YAG phosphor was produced as a target by the mechanochemical treatment, YAG phase could be obtained but an excellent crystallinity could not be achieved in comparison with one or more embodiments of the present invention.

Example 6

As raw materials of $Li_{6.25}Ga_{0.25}La_3Zr_2O_{12}$, powders of $Li_2O$, $La_2O_3$, $ZrO_2$, and $Ga_2O_3$ having the following properties respectively were weighed at a stoichiometric ratio that forms $Li_{6.25}Ga_{0.25}La_3Zr_2O_{12}$ as the obtained composite metal oxide, and in a total amount of 20 g.

$Li_2O$: In a 100 cc of a vessel made of zirconia, $Li_2O$ manufactured by Kojundo Chemical Laboratory Co., Ltd. and having a purity of 99%, a specific surface area of 2.1 m$^2$/g, and a specific surface area diameter $d_{BET}$ of 1421 nm and zirconia ball of 50 cc were added to be pulverized in a dry state at 96 rpm and for 24 hours. The pulverization was conducted in a glovebox in which a dew point was −90° C. Thus obtained $Li_2O$ with a specific surface area Sw of 8.4 m$^2$/g, and a specific surface area diameter $d_{BET}$ of 355 nm was used.

$La_2O_3$: In a 1 liter of a vessel made of zirconia, zirconia ball of 5 mm and 500 cc, ethanol and $La_2O_3$ manufactured by Kojundo Chemical Laboratory Co., Ltd. and having a purity of 99.9%, a specific surface area of 1.7 m$^2$/g, and a specific surface area diameter $d_{BET}$ of 543 nm were added to be pulverized in a wet state at 80 rpm for 24 hours in an air atmosphere. Thus obtained $La_2O_3$ with a specific surface area Sw of 11.5 m$^2$/g, and a specific surface area diameter, $d_{BET}$, of 80 nm was used.

$ZrO_2$: $ZrO_2$ manufactured by Kojundo Chemical Laboratory Co., Ltd. and having a purity of 98%, a specific surface area Sw of 18.4 m$^2$/g, and a specific surface area diameter $d_{BET}$ of 57 nm was used.

$Ga_2O_3$: $Ga_2O_3$ manufactured by Kojundo Chemical Laboratory Co., Ltd. and having a purity of 99.99%, a specific surface area Sw of 10.4 m$^2$/g, and a specific surface area diameter $d_{BET}$ of 90 nm was used.

The raw materials and a mixture of LiF and $BaF_2$ as fluxes were put into a grinding mill shown in FIG. 1. A molar ratio of LiF to $BaF_2$ was 85:15. A specific surface area diameter $d_{BET}$ of LiF was 649 nm, and a specific surface area diameter $d_{BET}$ of $Ba_2F$ was 137 nm. An amount of fluxes was 10 parts by mass to the 100 parts by mass of total amount of raw materials. A bottomed cylindrical vessel 1 having an internal diameter of 80 mm was composed of SUS304, and the clearance 4 between the inner circumference of the vessel 1 and the end blade 3 of the rotor 2 was 0.8 mm. The grinding mill was rotated at the frequency per minute of 4500 rpm and the power requirement of 3 kW for 10 minutes to conduct a mechanochemical treatment. Endo-point temperature of the vessel was 143.8° C.

Example 7

Powders of $Li_2O$, $La_2O_3$, $ZrO_2$, and $Ga_2O_3$ were weighed at a stoichiometric ratio that forms $Li_{6.4}Ga_{0.2}La_3Zr_2O_{12}$ as the obtained composite metal oxide, and in a total amount of 20 g. The mechanochemical treatment was conducted similarly to Example 6 except that the flux used was changed to the mixture of LiF and $YF_3$ in the molar ratio of 85:15 and the grinding mill was rotated at 3 kW for 40 minutes. The specific surface area diameter $d_{BET}$ of LiF was 649 nm, and the diameter of LiF used in the following examples had the same value.

Example 8

Powders of $Li_2O$, $La_2O_3$, $ZrO_2$, and $Ga_2O_3$ were weighed at a stoichiometric ratio that forms $Li_{6.4}Ga_{0.2}La_3Zr_2O_{12}$ as the obtained composite metal oxide, and in a total amount of 20 g. The mechanochemical treatment was conducted similarly to Example 6 except that the flux used was changed to the mixture of LiF and $SrF_2$ in the molar ratio of 85:15.

Example 9

Powders of $Li_2O$, $La_2O_3$, $ZrO_2$, and $Ga_2O_3$ were weighed at a stoichiometric ratio that forms $Li_{6.55}Ga_{0.15}La_3Zr_2O_{12}$ as the obtained composite metal oxide, and in a total amount of 20 g. The mechanochemical treatment was conducted similarly to Example 6 except that the flux used was changed to the mixture of LiF and $ScF_3$ in the molar ratio of 85:15 and the grinding mill was rotated at 3 kW for 30 minutes.

Each of Samples obtained in example 6 to 9 was placed in a metal mold and a pressure of 375 MPa was applied to the sample to form a pellet with a diameter of 10 mm and a thickness of 1 mm. A bottom of an alumina crucible was covered with LLZO powder of tetragonal system so as to reduce a volatile of Li in firing, the formed pellet was left on the LLZO powder covering the bottom. The pellet itself was then covered with LLZO powder, fired for 20 hours at 1230° C. in a nitrogen atmosphere, and a sintered body of the pellet was obtained. Both sides of the sintered body were grinned and spattered with Au in a dry room having a dew point of −60° C. to form an electrode having a diameter of 8 mm. In example 8, the above forming and firing process of the pellet was conducted after the pulverizing process of the sample mechanochemically treated to enhance a relative density. The pellet sintered body with the electrode was set to an evaluation cell for all-solid-state batteries manufactured by Hohsen Corp, connected to a potentio-galvanostat, and a measurement of an impedance was conducted within the temperature range from room temperature to 100° C. to evaluate $Li^+$ ion conductivity (S/cm).

As a result, the $Li^+$ ion conductivity (S/cm) at 25° C. was $6.4\times10^{-4}$ S/cm in example 6, $3.1\times10^{-4}$ S/cm in example 7, $5.3\text{-}10^{-4}$ S/cm in example 8, $3.6\times10^{-4}$ S/cm in example 9, and all these results of the examples showed excellent ion conductivity of $1.0\times10^{-4}$ S/cm or more.

The garnet-type composite metal oxide of one or more embodiments of the present invention can be suitably used as a solid electrolyte material for a secondary battery, a phosphor material or the like.

DESCRIPTION OF THE REFERENCE NUMERALS

1 bottomed cylindrical vessel
2 rotor
3 end blade
4 clearance
5 mixture comprising raw material powders and a flux Although the disclosure has been described with respect to only a limited number of embodiments, those skilled in the art, having benefit of this disclosure, will appreciate that various other embodiments may be devised without departing from the scope of one or more embodiments of the present invention. Accordingly, the scope of the invention should be limited only by the attached claims.

The invention claimed is:

1. A method for producing a garnet-type composite metal oxide, the method comprising:
    mechanochemically treating a mixture comprising raw material powders and at least one flux to react the raw material powders,
    wherein the raw material powders comprise a Li source powder, a La source powder and a Zr source powder,
    wherein the garnet-type composite metal oxide comprises Li, La, Zr and O,
    wherein the at least one flux comprises at least one selected from the group consisting of a metal halide, PbO, $B_2O_3$, $Al(OH)_3$, $Ga(OH)_3$, KOH, $Sr(OH)_2$, NaOH, $Ba(OH)_2$, and $Mg(OH)_2$,
    wherein during the mechanochemically treating of the mixture, strain energy is accumulated in the raw material powders and released as heat energy,
    wherein the mechanochemically treating is conducted by shearing the mixture comprising the raw material powders and the at least one flux in a bottomed cylindrical vessel equipped with a rotor having an end blade,
    wherein a curvature of the end blade is smaller than a curvature of an inner circumference of the bottomed cylindrical vessel such that there is a predetermined clearance between the end blade and the inner circumference of the bottomed cylindrical vessel,
    wherein the mixture comprising the raw material powders and the at least one flux is sheared while being compressed in the clearance by the rotor rotating, and
    wherein the clearance is 100 um or more and 0.9 mm or less.

2. The method according to claim 1, wherein the raw material powders further comprise at least one selected from the group consisting of an Al source powder and a Ga source powder.

3. The method according to claim 2, wherein a crystal system of the garnet-type composite metal oxide is a cubical crystal.

4. The method according to claim 2, wherein the Li source powder is a Li oxide powder, the La source powder is a La oxide powder, the Zr source powder is a Zr oxide powder, the Al source powder is an Al oxide powder and the Ga source powder is a Ga oxide powder.

5. The method according to claim 1, wherein a crystallite diameter of the garnet-type composite metal oxide is 30 nm or more.

6. The method according to claim 1, wherein a power of the rotor to a total amount of the raw material powders is 0.05 kW/g or more, and the rotor is rotated for 10 minutes or more.

7. The method according to claim 6, wherein at least one flux comprises the metal halide and the metal halide is at least one selected from the group consisting of a $BaF_2$, $YF_3$, $AlF_3$, $SrF_3$, and LiCl.

8. The method according to claim 7, wherein the metal halide is LiCl.

9. The method according to claim 1, wherein heat is not applied from an external heat source.

10. The method according to claim 1, wherein the at least one flux comprises the metal halide and wherein the metal halide is at least one selected from the group consisting of a $BaF_2$, $YF_3$, $AlF_3$, $SrF_3$, and LiCl.

11. The method according to claim 10, wherein the metal halide is LiCl.

12. The method according to claim 1, wherein an amount of the flux to a total amount of the raw material powders is 4 mass % or more and 15 mass % or less.

* * * * *